United States Patent [19]
Johanning

[11] Patent Number: 4,512,521
[45] Date of Patent: Apr. 23, 1985

[54] APPARATUS FOR GRANULATING AND CONVEYING CORN-COB MIX

[75] Inventor: Hermann Johanning, Melle, Fed. Rep. of Germany

[73] Assignee: Engelbrecht & Lemmerbrock GmbH & Co., Melle, Fed. Rep. of Germany

[21] Appl. No.: 449,624

[22] Filed: Dec. 14, 1982

[30] Foreign Application Priority Data

Dec. 17, 1981 [DE] Fed. Rep. of Germany ....... 3149981

[51] Int. Cl.³ ............................................ B02C 13/286
[52] U.S. Cl. ........................................ 241/34; 241/56; 241/62; 241/69; 241/186 A
[58] Field of Search ...................... 241/34, 55, 56, 57, 241/58, 59, 62, 69, 101 B, 101.5, 101.6, 101.7, 186 A, 185 A

[56] References Cited

U.S. PATENT DOCUMENTS

| | | | |
|---|---|---|---|
| 1,765,309 | 6/1930 | O'Neill | 241/56 |
| 1,960,346 | 5/1934 | Myers | 241/56 |
| 4,174,072 | 11/1979 | Kline | 241/186 A X |
| 4,326,675 | 4/1982 | Engle et al. | 241/101.7 X |

FOREIGN PATENT DOCUMENTS

663428   5/1979   U.S.S.R. .................... 241/186 A

*Primary Examiner*—Mark Rosenbaum
*Attorney, Agent, or Firm*—Balogh, Osann, Kramer, Dvorak, Genova & Traub

[57] ABSTRACT

The invention relates to an apparatus for granulating corn-cob mix and for conveying the granulate into a silo, transport truck or the like, including a mill comprising an integrated blower and a conveyor pipe joined tangentially to the blower. The mill is constituted by a beater mill that comprises a blower located behind a sieve within a circular casing and having a rotor arranged concentrically therein. A suction pipe is connected to the beater mill and comprises a secondary air opening adjustable in width, the suction pipe passing into a chamber supplied with the material which is to be milled from a reception container by means of a conveyor screw or other conveying means and the width of the suction pipe is greater by 35-70% than the width of the conveying pipe at the pressure-side of the blower. This enables the setting of the supply of material to be milled to the mill comprising a blower once, without having to undertake another governing operation.

8 Claims, 4 Drawing Figures

APPARATUS FOR GRANULATING AND CONVEYING CORN-COB MIX

BACKGROUND OF THE INVENTION

The present invention relates to an apparatus for granulating corn-cob mix and for conveying the granulate into a silo, a transport truck or the like, including a mill comprising a blower and a conveying pipe joined tangentially to the blower.

It is known that corn-cob mix (hereinafter referred to as "CCM") may be granulated and that the granulate may be conveyed pneumatically into a silo or onto a transport truck in the field. Use has already been made for this purpose of mills comprising an integrated blower and a tangential pneumatic conveying pipe, which were driven by the P.T.O. shaft of a tractor or of a goods vehicle diesel engine. A hopper preceding the mill was supplied with material for milling from a tipper or from a pit or reception tank by means of a conveying screw and this material trickled into the mill, being adapted to the mill performance in its quantity by means of a control slide, or was forced fed into the mill by means of a ramming screw. The trickling feed of CCM may lead to difficulties in view of the commonly very high humidity content of up to 50% and more, and the supply by means of a ramming screw is very problematical since a very precisely matched control operation, or a mill operation at less than capacity, would then be required to prevent clogging.

It is an object of the invention to provide means such that the feed of material to be milled may be set once and for all to the mill, without having to perform any complementary governing operation.

SUMMARY OF THE INVENTION

To achieve this and other objects, the invention provides for an apparatus for granulating corn-cob mix and for conveying the granulate into a silo, transport truck or the like, including a mill that comprises an integrated blower and a conveyor pipe joined tangentially to the blower. The mill is constituted by a beater mill comprising a blower located behind a sieve within a circular casing and having a rotor arranged concentrically therein. A suction pipe is connected to the beater mill and comprising a secondary air opening which is adjustable in width, the suction pipe passing into a chamber to be supplied with the material which is to be milled from a reception container by means of a conveying means. The width of the suction pipe being greater by 35 to 70% than the width of the conveyor pipe arranged at the positive pressure side of the blower.

Due to this construction, the mill or specifically its blower, draws the material milled directly out of the chamber, the quantity drawn in by suction power being adjusted to a fixed value by a once-only adjustment of the width of the secondary air opening. In this connection, it is essential that the width of the suction pipe be chosen say 35 to 70% greater than the width of the pressure-side conveyor pipe, because the lumpy or granular CCM is already picked up by suction at low conveying air speed, whereas the milled material or granulate requires a substantially increased air speed. It is now possible in this manner, to adapt the suction volume to the performance limit of the pneumatic conveyor pipe attached, by adjusting the secondary air flap in such manner that as much CCM is drawn in by suction as the quantity of granulate which may be discharged pneumatically via the conveyor pipe into a receptacle situated at a higher level than the mill. If the screen placed between the mill and the blower, which determines the grain size of the granulate, gives rise to trouble by accumulation of granulate particles, the mill adapts itself to this trouble since less conveying air is then drawn in by suction because of the increased resistance, so that less CCM is also extracted from the chamber. In this connection, it is advantageous that the blower casing has its whole circumference circularly formed around the shaft, the blower rotor revolving concentrically within the casing.

Care should then be taken to ensure that sufficient material for milling is always available for take-up by suction, the mill rating or the rating of the assembly as a whole, being adapted as far as possible to the CCM quantity obtained during combine harvesting, consequently requiring considerable power, e.g. advantageously a commercial vehicle engine of 150 to 200 horsepower. Since CCM may contain up to 50% of water or more depending on atmospheric conditions, and this gives rise to trouble, care should be applied to feed the material for milling to the mill in unobjectionable manner. This may be accomplished by the fact that the speed of revolution of the conveying screw or worm is adjustable by means of an infinitely variable geared motor which may be turned off by a sensor operating in capacitive manner within the suction chamber, if the screw conveys more material for milling into the chamber than is actually extracted by suction.

In order that costly geared motors of infinitely adjustable r.p.m. may be avoided however, it is more advantageous to keep the speed of revolution of the screw at a constant value, in which case a little more material for milling is conveyed into the chamber than can be extracted by suction. To this end, the chamber is preceded by an uptake shaft in which the material for milling is accumulated by virtue of the surplus quantity, the upper section of the uptake shaft having installed in it a sensor which is actuated by the increasing material for milling and turns off the screw motor until the material for milling has dropped again within the uptake shaft. A compression of the material for milling within the reception container by the screw, which would also cause fracturing in such case, is then prevented by the fact that the material for milling is set in motion constantly or intermittently within the reception container or before the chamber, as will hereinafter be described.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF THE PREFERRED EMBODIMENT

Figure 1:
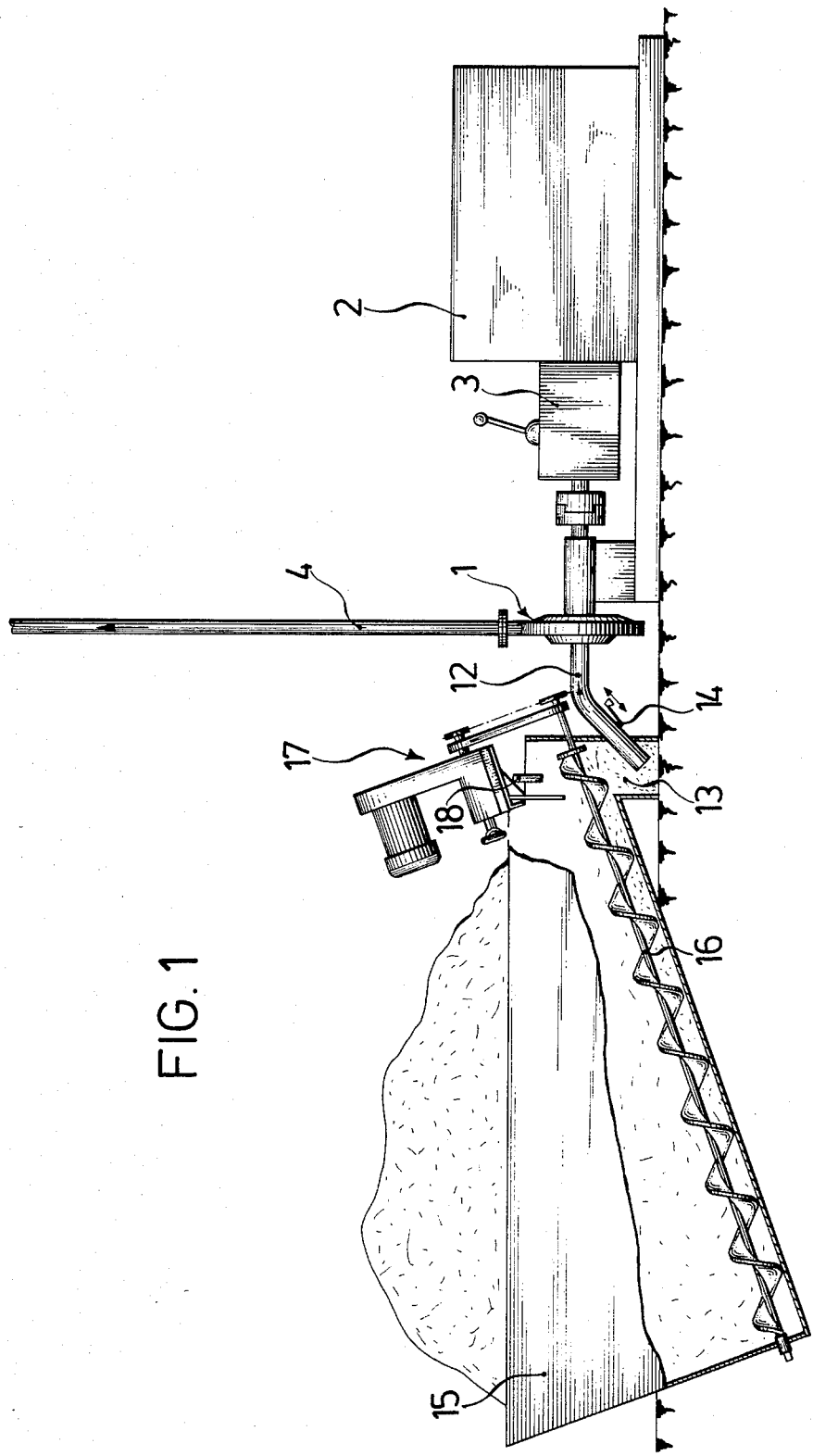
FIG. 1 shows the apparatus diagrammatically in side view, giving a cross-section through the reception container comprising a suction chamber.

Referring now to the drawing, for the purpose of granulating CCM harvested by means of a reaping thresher, use is made in accordance with the invention of a beater mill 1 comprising an integrated blower, which is adjusted to an appropriate output corresponding to the performance of a reaping thresher and is driven by a commerical vehicle engine 2 comprising a change-speed gear 3, or by another diesel engine of, say, 150 to 200 horsepower.

Figure 4:
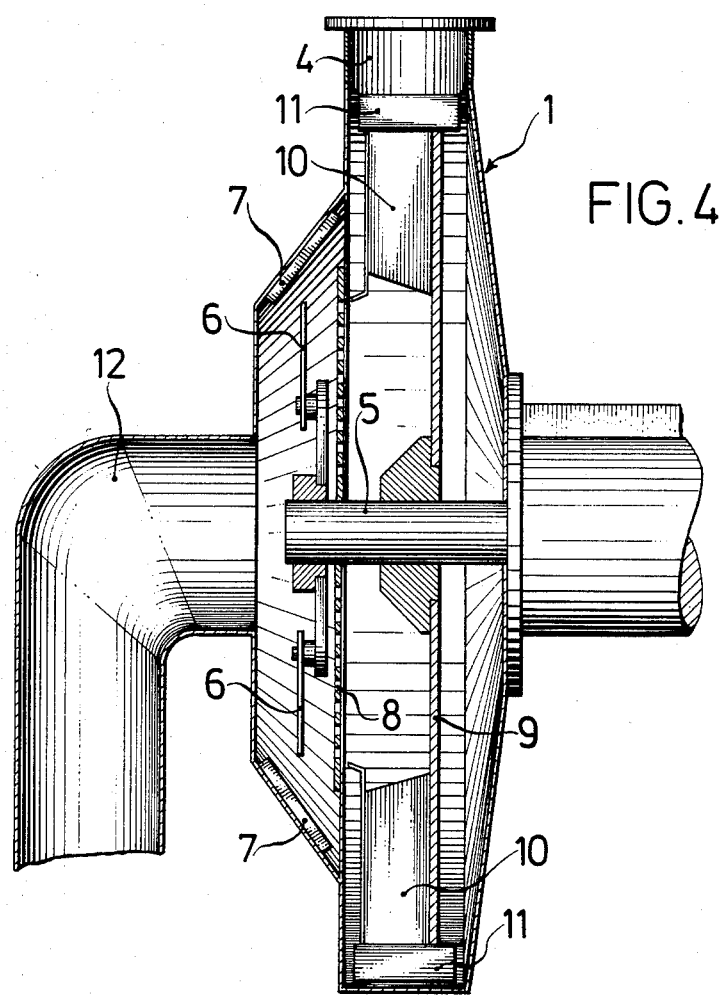
FIG. 4 shows a vertical axial cross-section through the mill.

The mill 1 shown in greater detail in FIG. 4 has a casing of circular shape and a tangentially connected pressure-side conveyor pipe 4. Together with the driven shaft 5, a plate comprising movably hinged beaters 6 confronted by braking bars 7 in the casing, is journalled at the suction side. Behind the beater 6, the casing is subdivided by a sieve 8 which determines the fineness of the granulate. Behind the sieve is situated a rotor 9 comprising vanes 10 which are continued by clearing blades 11 transversely to the direction of revolution, which would strip the inner periphery of the casing clean if granulate were to settle thereon.

In accordance with the invention, a suction pipe 12 the width of which is approximately 35-75% greater than the width of the pressure-side conveyor pipe 4, is connected to the ingress end side of the mill 1. The suction pipe 12 penetrates (or being dipped) into a chamber 13 which is at a lower level than the mill 1 and is provided with a secondary air opening 14 the aperture width of which is adjustable, e.g. by means of a slider.

CCM is fed to the suction chamber 13 from a tank 15 charged with harvested CCM, for example by means of a transport truck, by means of an entrainable conveying worm or screw 16. According to FIG. 1, the driving system comprises a geared motor 17 having an infinitely variable speed of revolution, which feeds as much CCM into the chamber 13 as is drawn off by suction from the mill comprising a blower via the suction pipe 12, this quantity removed by suction being adapted to the performance limit of the conveying pipe 4 for the granulate. Within the upper section of the suction chamber 13 is installed a sensor 18, for example operating in capacitive manner, whereby the drive 17 is turned off if the chamber 13 is supplied with more CCM than can be removed by suction from the mill. The drive 17 is turned on again automatically after the CCM level has dropped in the chamber 13.

Since geared motors 17 of infinitely variable speed of revolution are very costly, it is advantageous to select a different means of feeding CCM into the chamber 13. The procedure adopted to this end in accordance with FIG. 2 consists in that the suction chamber 13 is preceded by an uptake shaft 19 in front of which terminates the screw turning at constant speed of revolution and to which the CCM is fed from the reception container 15 by means of the conveying screws 16, and from which the suction chamber 13 receives its supply. In this case, more CCM must be fed to the chamber 13 by the conveying screw 16 than can be drawn off by suction. The surplus quantity rises within the uptake shaft 19 during this time, until a sensor or feeler 20 is acted upon thereby, which turns off the drive to the screw 16. The drive to the screw 16 is turned on again automatically, only after the level of material in the uptake shaft 19 has dropped. To prevent compression of the CCM in the uptake shaft 19, it is advantageous to install an agitator or moving mechanism 21 within the uptake shaft 19, whereby the CCM is kept in constant motion, so that subsequent charging of the suction chamber 13 is not obstructed.

Figure 2:
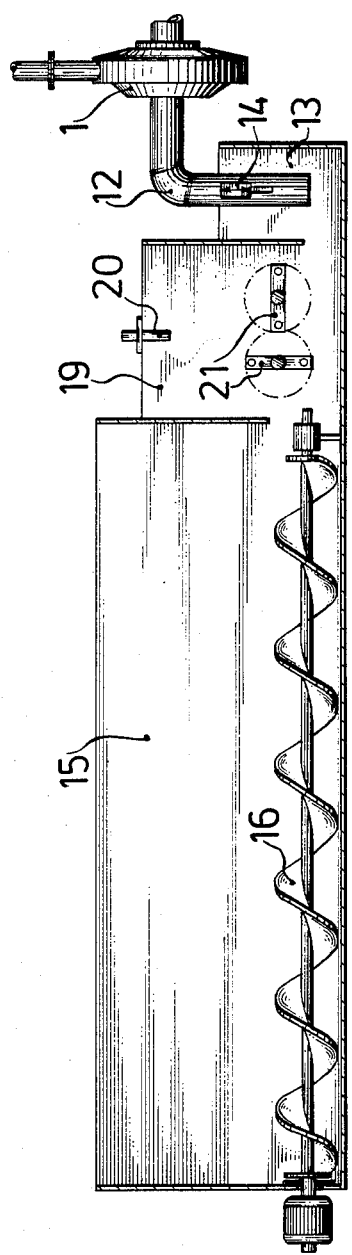
FIG. 2 shows a horizontal reception container comprising an agitator mechanism within an uptake shaft and with the suction pipe of the mill penetrating into the suction chamber.
Figure 3:
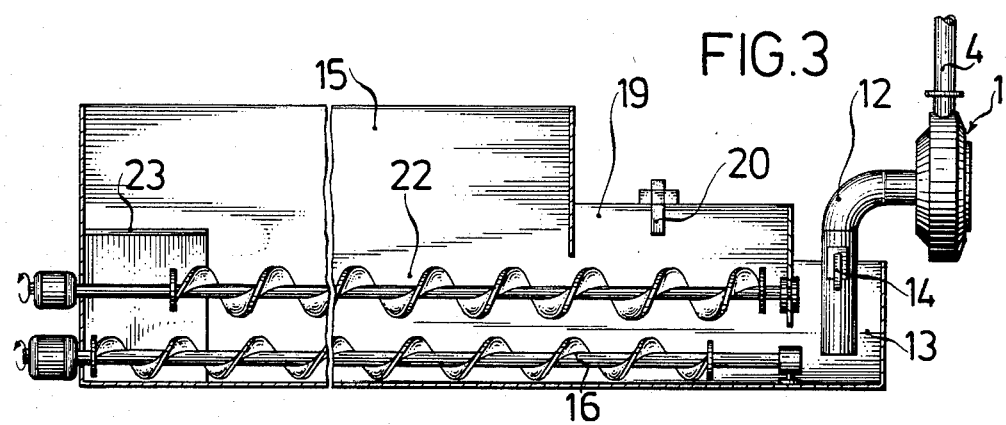
FIG. 3 shows another embodiment of the reception container, which represents a modification of the arrangement shown in FIG. 2.

According to a modification of the embodiment shown in FIG. 2, the procedure applied according to FIG. 3 consists in that the conveying screw 16 projects into the uptake shaft 19 and that above said screw 16 is installed another offset return screw 22 which returns the material for milling back to the start of the screw 16 from the uptake shaft 19. To this end, the return screw 22 projects farther into the uptake shaft 19 than the conveying screw 16 and terminates at a point spaced from the beginning of the screw 16, advantageously beneath a cover 23, whereby the material for milling is again fed to the screw 16 in free fall, and assuring that the return to the start of the screw 16 is not impeded whilst the container 15 is being filled.

As illustrated in the case of FIG. 1, the container 15 may be mounted in fixed manner, or may be mounted on a transport truck together with the mill and the driving system so that the material for milling may already be milled in the field and whereby the granulate may thereupon be blown on to a transport vehicle.

If the reception container 15 is mounted horizontally or approximately horizontally, it may be arranged to be pivotable around the aperture of the suction pipe 12 with respect to the mill and driving system, to secure an adaptation to the prevailing spatial conditions.

I claim:

1. Apparatus for granulating corn cob mix, and for conveying the granulate into a receptacle situated at a higher level than that of the apparatus, which comprises a beater mill comprising a casing divided by a sieve which determines fineness of the granulate, an integrated blower disposed in the casing behind the sieve, and a conveyor pipe tangentially connected to said blower, and directed into said receptacle, a suction pipe connected to the beater mill and provided with a secondary air opening, the aperture width thereof being adjustable, the width of said suction pipe being greater by 35 to 70% than the width of the conveyor pipe, a suction chamber disposed at a lower level than that of the beater mill for dipping thereinto said suction pipe, and conveyor means disposed in the suction chamber for feeding corn cob mix thereinto, so as to allow the corn cob mix to be sucked into the beater mill by means of said suction pipe.

2. Apparatus according to claim 1, wherein said conveying means comprises a conveying screw, and drive means are provided for adjusting the speed of revolution of the screw, said drive means comprising an infinitely variable geared motor, and wherein the suction chamber comprises a first sensor disposed therein for turning off the variable geared motor when the screw has fed more corn cob mix material into the chamber than that extracted by suction via said suction pipe.

3. Apparatus according to claim 1, wherein an uptake shaft is connected in front of the suction chamber for receiving corn cob mix material fed by said conveyor means, and said conveyor means comprise a conveying screw terminating in front of said uptake shaft, the material received by said uptake shaft moving up and down therein depending upon suction power of said blower.

4. Apparatus according to claim 3, wherein said uptake shaft comprises a device for moving the corn cob mix material fed therein by said conveying screw.

5. Apparatus according to claim 3, further comprising said conveying screw projecting into said uptake shaft, and an offset return screw for conveying corn cob mix material out of said uptake shaft being located above said conveying screw, projecting farther into said uptake shaft than said conveying screw, and terminating at a point spaced from the beginning of said conveying screw.

6. Apparatus according to claim 3, further comprising a second sensor situated in the upper section of said uptake shaft, said second sensor being operated by accumulation of the corn cob mix material in said uptake shaft, for turning off said conveying screw.

7. Apparatus according to claim 1, further comprising a reception container for harvested corn cob mix material being conveyed by said conveying means to the suction chamber, said reception container being pivotally arranged around the opening of said suction pipe in the suction chamber.

8. Apparatus according to claim 1, wherein said integrated blower comprises a rotor having at the periphery thereof, clearing blades extending transversely to the direction of revolution, for clearing the inner periphery of the casing.

* * * * *